(12) United States Patent
Foege et al.

(10) Patent No.: US 9,047,135 B2
(45) Date of Patent: Jun. 2, 2015

(54) QUALITATIVE ASSIGNMENT OF RESOURCES TO A LOGICAL PARTITION IN A MULTIPARTITIONED COMPUTER SYSTEM

(75) Inventors: Stephanie A. Foege, Oakbrook Terrace, IL (US); Andres Gonzalez, Jr., Chicago, IL (US); Shantan Kethireddy, Chicago, IL (US); Meryl Lo, Lucas, TX (US); Annita Tomko, Jalisco (MX)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 12/691,891

(22) Filed: Jan. 22, 2010

(65) Prior Publication Data

US 2011/0185062 A1   Jul. 28, 2011

(51) Int. Cl.
| | | |
|---|---|---|
| G06F 15/173 | (2006.01) | |
| G06F 15/177 | (2006.01) | |
| G06F 13/00 | (2006.01) | |
| G06F 3/00 | (2006.01) | |
| G06F 9/50 | (2006.01) | |

(52) U.S. Cl.
CPC .................................... *G06F 9/5077* (2013.01)

(58) Field of Classification Search
None
See application file for complete search history.

(56) References Cited

U.S. PATENT DOCUMENTS

| | | | |
|---|---|---|---|
| 6,574,605 B1 * | 6/2003 | Sanders et al. | 705/7.26 |
| 6,675,149 B1 * | 1/2004 | Ruffin et al. | 705/7.12 |
| 7,266,823 B2 | 9/2007 | Alford, Jr. | |
| 7,565,398 B2 | 7/2009 | Ashok et al. | |
| 8,578,076 B2 * | 11/2013 | van der Linden et al. | 710/72 |
| 8,656,024 B2 * | 2/2014 | Krishnan et al. | 709/226 |
| 2007/0101334 A1 * | 5/2007 | Atyam et al. | 718/102 |
| 2007/0174458 A1 * | 7/2007 | Boyce et al. | 709/226 |
| 2008/0177879 A1 * | 7/2008 | Krishnan et al. | 709/226 |
| 2011/0022812 A1 * | 1/2011 | van der Linden et al. | 711/163 |

* cited by examiner

*Primary Examiner* — Ranodhi Serrao
*Assistant Examiner* — Thomas Richardson
(74) *Attorney, Agent, or Firm* — Matthew J. Bussan

(57) ABSTRACT

A qualitative resource assignment wizard receives qualitative information for a logical partition (LPAR) and calculates computer resource assignments for the LPAR based on the qualitative information and a set of conversion functions. For example, the qualitative resource assignment wizard may calculate a processing unit assignment, a memory assignment, and an I/O slot assignment for the LPAR. The qualitative information may be input by a user, for example, utilizing a graphical user interface (GUI). In one embodiment, the conversion functions are calculated during a training phase, in which a user periodically provides qualitative information while resource usage data is gathered. The wizard may reside in a hardware management console (HMC) or other administrative console and/or may be a component of a hypervisor or other partition management code. Software code associated with the wizard may be provided by a network server application to a client system for enabling a user to remotely input the qualitative information.

18 Claims, 13 Drawing Sheets

900 — Qualitative Resource Assignment Setup:

Usage Constraint #1:

Label: | Number of Customers | — 902

Type: | Numeric ▽ | — 904

Usage Constraint #2:

Label: | Priority | — 902

Type: | Value from Set ▽ | — 904

Values: | High, Low, Medium | — 906

[ Add New ... ]  [ Done ]
     908         910

FIG. 9

QUALITATIVE ASSIGNMENT OF RESOURCES TO A LOGICAL PARTITION IN A MULTIPARTITIONED COMPUTER SYSTEM

BACKGROUND OF THE INVENTION

1. Field of Invention

The present invention relates in general to the data processing field. More particularly, the present invention relates to a method, apparatus and computer program product for assigning computer resources to a logical partition in a multipartitioned computer system using qualitative information and conversion functions.

2. Background Art

Computer systems typically include a combination of hardware and software. The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. Such a computer system is often referred to as a multipartitioned computer system. The IBM Power Systems (formerly IBM System i) computer system developed by International Business Machines Corporation is an example of a computer system that supports logical partitioning. If logical partitioning on an IBM System i computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources (e.g., processors, memory, persistent storage, and other physical hardware) amongst the logical partitions. For example, a computer system with a single CPU could have two logical partitions defined, with 50% of the CPU assigned to each logical partition, with 33% of the memory assigned to the first logical partition and 67% of the memory assigned to the second logical partition, and with two different I/O slots assigned to the two logical partitions, one per partition. Once logical partitions are defined and shared resources are assigned to the logical partitions, each logical partition acts as a separate computer system. Thus, in the example above that has a single computer system with two logical partitions, the two logical partitions will appear for all practical purposes to be two separate and distinct computer systems.

Many modern computer systems (e.g., server systems) have logical partitioning management approaches that require an extremely high level of technical knowledge to assign computer resources to logical partitions. Such a conventional logical partitioning management approach is exemplified by U.S. Pat. No. 7,565,398 B2, issued Jul. 21, 2009 to Shamsundar Ashok et al., and entitled "PROCEDURE FOR DYNAMIC RECONFIGURATION OF RESOURCES OF LOGICAL PARTITIONS". Using a graphical user interface (GUI), a user may indicate a plurality of resources that are to be involved in a partition reconfiguration. Some users, however, are not familiar with computer science concepts that are commonly used in conventional logical partitioning management approaches, such as the "number of CPU's to move/add/remove", "amount of memory to move/add/remove", "adapters used by this partition", "free system adapters", etc.

Moreover, when automated partitioning capability is provided in conventional logical partitioning management approaches, it is typically reactive rather than proactive. In a typical reactive automated partitioning scheme, an agent detects over-utilization of a resource in a partition and then assigns more of the resource to the partition. A more proactive automated partitioning scheme is exemplified by U.S. Pat. No. 7,266,823 B2, issued Sep. 4, 2007 to Jack A. Alford, Jr., and entitled "APPARATUS AND METHOD OF DYNAMICALLY REPARTITIONING A COMPUTER SYSTEM IN RESPONSE TO PARTITION WORKLOADS". A workload schedule is used to re-deploy resources in advance of peak periods and then re-assign the resources back to their original partitions after the peak periods are over. The partitions, however, are defined in a conventional manner. A system administrator, using a GUI or the resource management software language command, specifies the number of CPUs, the amount of memory and the specific I/O slots that will be devoted to each partition. This requires an extremely high level of technical knowledge. While a system administrator will typically have the requisite technical knowledge, other users may not be familiar with computer science concepts that are commonly used to assign computer resources to logical partitions.

Therefore, a need exists for an enhanced mechanism for assigning computer resources to logical partitions in a multipartitioned computer system, especially for users that are not familiar with computer science concepts.

SUMMARY OF THE INVENTION

According to the preferred embodiments of the present invention, a qualitative resource assignment wizard receives qualitative information for a logical partition (LPAR) and calculates computer resource assignments for the LPAR based on the qualitative information and a set of conversion functions. For example, the qualitative resource assignment wizard may calculate a processing unit assignment, a memory assignment, and an I/O slot assignment for the LPAR. The qualitative information may be input by a user, for example, utilizing a graphical user interface (GUI). In one embodiment, the conversion functions are calculated during a training phase, in which a user periodically provides qualitative information while resource usage data is gathered. The wizard may reside in a hardware management console (HMC) or other administrative console and/or may be a component of a hypervisor or other partition management code. Software code associated with the wizard may be provided by a network server application to a client system for enabling a user to remotely input the qualitative information.

BRIEF DESCRIPTION OF THE DRAWINGS

The preferred exemplary embodiments of the present invention will hereinafter be described in conjunction with the appended drawings, where like designations denote like elements.

FIGS. 8-11 are screen shots each illustrating an exemplary qualitative resource assignment (QRA) wizard graphical user interface (GUI) at different stages during a training phase in accordance with the preferred embodiments of the present invention. In the stage shown in FIG. 8, a QRA enablement GUI is displayed and a user selects whether or not to enable the QRA wizard. In the stage shown in FIG. 9, a QRA setup GUI is displayed and the user sets up one or more usage constraints. In the stage shown in FIG. 10, a QRA data collection GUI is displayed and the user inputs qualitative information. In the stage shown in FIG. 11, another QRA data collection GUI is subsequently displayed and the user inputs updated qualitative information.

FIG. 13 includes a screen shot illustrating a prior art GUI for creating a new partition that requires a user to input computer resource information (i.e., megabytes of memory).

FIG. 14 includes a screen shot illustrating a qualitative resource assignment (QRA) create GUI for creating a new partition that requires a user to input qualitative information (i.e., the number of customers).

DETAILED DESCRIPTION OF THE PREFERRED EMBODIMENTS

1. Overview

In accordance with the preferred embodiments of the present invention, a qualitative resource assignment wizard receives qualitative information for a logical partition (LPAR) and calculates computer resource assignments for the LPAR based on the qualitative information and a set of conversion functions. For example, the qualitative resource assignment wizard may calculate a processing unit assignment, a memory assignment, and an I/O slot assignment for the LPAR. The qualitative information may be input by a user, for example, utilizing a graphical user interface (GUI). In one embodiment, the conversion functions are calculated during a training phase, in which a user periodically provides qualitative information while resource usage data is gathered. The wizard may reside in a hardware management console (HMC) or other administrative console and/or may be a component of a hypervisor or other partition management code. Software code associated with the wizard may be provided by a network server application to a client system for enabling a user to remotely input the qualitative information.

2. Detailed Description

In the embodiment shown in FIG. 1, described further below, the computer system 100 is a logically-partitioned platform. For those not familiar with the concepts of logical partitions, background information is provided below with reference to FIGS. 2-4 that will help to understand the present invention.

Figure 2:
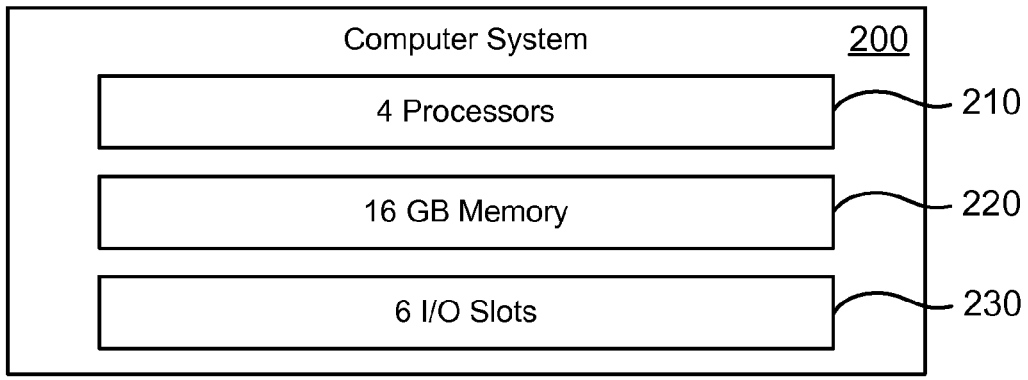
FIG. 2 is a block diagram of a prior art computer system before logical partitioning.
Figure 3:
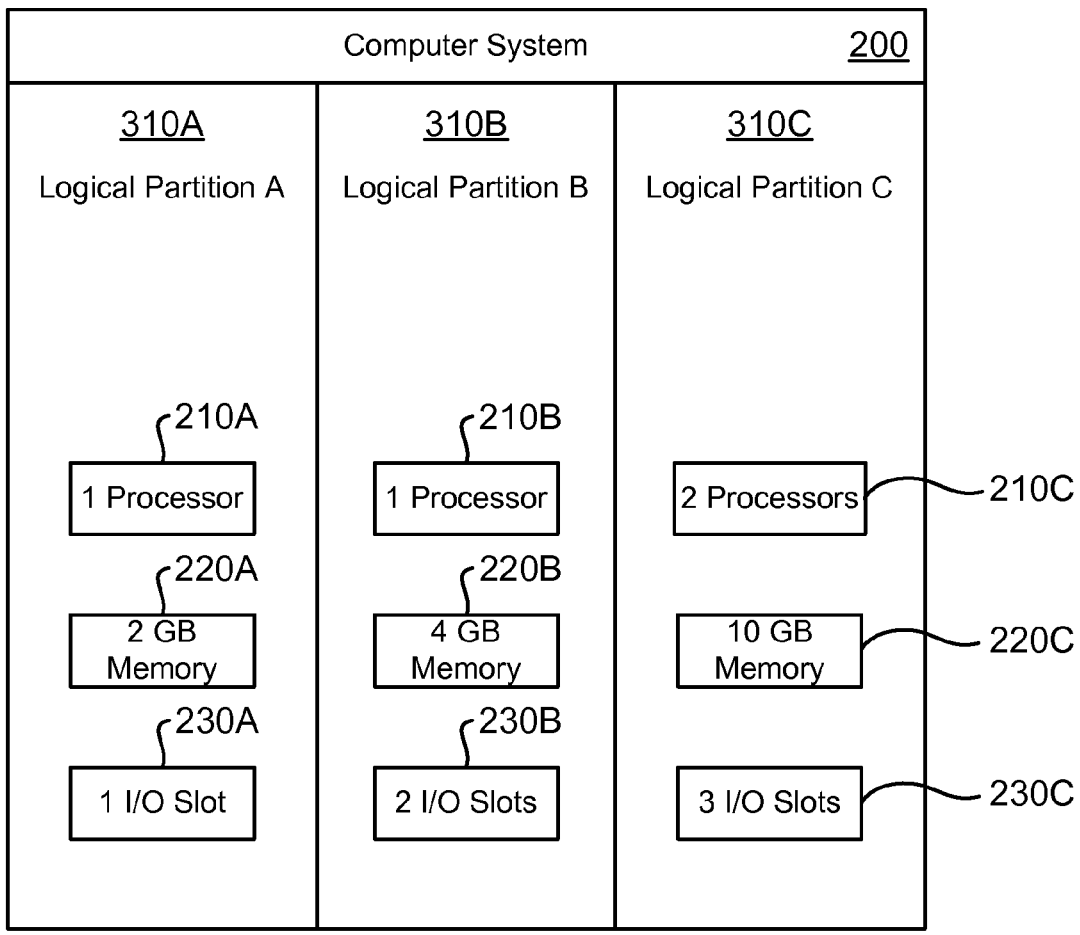
FIG. 3 is a block diagram of the prior art computer system in FIG. 2 after logical partitioning.

As stated in the Background Art section above, a computer system may be logically partitioned to create multiple virtual machines on a single computer platform. Referring to FIG. 2, a sample computer system 200 is shown to include four processors 210, 16 GB of main memory 220, and six I/O slots 230. Note that there may be many other components inside a prior art computer system that are not shown in FIG. 2 for the purpose of simplifying the discussion herein. We now assume that the computer system 200 is configured with three logical partitions, as shown in FIG. 3. The first logical partition 310A is defined to have one processor 210A, 2 GB of memory 220A, and one I/O slot 230A. The second logical partition 310B is defined to have one processor 210B, 4 GB of memory 220B, and two I/O slots 230B. The third logical partition 310C is defined to have two processors 210C, 10 GB of memory 220C, and three I/O slots 230C. Note that the total number of processors (210A+210B+210C) equals the four processors 210 in the computer system 200. Likewise for the memory and the I/O slots. This is a simplified example. There can be unassigned/free resources (e.g., not all CPUs need to belong to some partition at some point in time).

Figure 4:
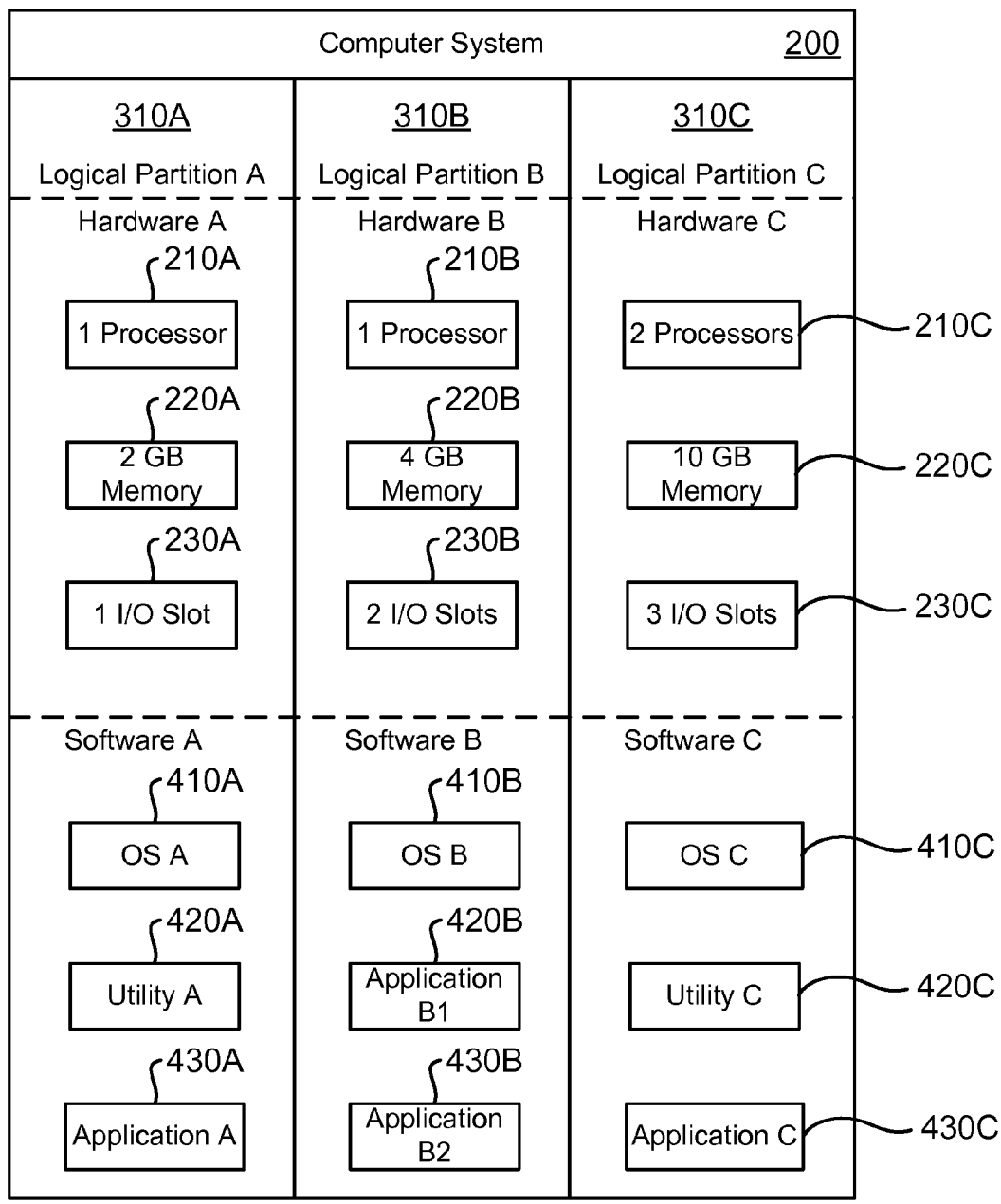
FIG. 4 is a block diagram of the prior art computer system in FIG. 3 after installing an operating system and other software in each logical partition.

Now that hardware resources have been assigned to the logical partitions, software may be installed, as shown in FIG. 4. First, an operating system is typically installed in each partition, followed by utilities or applications as the specific performance needs of each partition require. Thus, for example in FIG. 4, the first logical partition 310A includes an operating system 410A, a utility 420A, and an application 430A. The second logical partition 310B includes an operating system 410B, and two applications 420B and 430B. The third logical partition 310C includes an operating system 410C, a utility 420C, and an application 430C. Once the software is installed in the logical partitions as shown in FIG. 4, the logically-partitioned computer system 200 is ready for use.

Conventional logical partitioning management approaches typically require an extremely high level of technical knowledge to assign computer resources to logical partitions. Some users, however, are not familiar with computer science concepts that are commonly used in conventional logical partitioning management approaches, such as the "number of CPU's to move/add/remove", "amount of memory to move/add/remove", "adapters used by this partition", "free system adapters", etc.

In accordance with the preferred embodiments of the present invention, as much of the computer science jargon as possible is taken out of the process for partitioning a computer system, thereby assisting users that might not be familiar with the computer science concepts that are common in conventional partitioning processes. This is accomplished in the present invention by prompting the user to input qualitative information, which is translated into computer resource assignments through a set of conversion functions. For purposes of this patent application, the terminology "qualitative information" as utilized herein, including within the claims, is defined as constraints, variables and other data input by the user in terms familiar to the user (e.g., business terms, educational terms, medical terms, governmental terms, non-profit-organization terms, in-the-home terms, and the like), rather than in terms requiring the user's familiarity with computer science concepts. The qualitative information in business terms may be things like "Number of Transactions per Minute", "Number of Supported Customers", and "Priority", rather things like "Amount of Memory" and "Number of Processors".

Other examples of qualitative information include the "Identity/Title of User" (e.g., values for this qualitative information may include titles such as "CEO", "CFO", "Vice-President", "Manager", "Employee", etc. in business terms, and identities such as "Dad", "Mom", "Junior", "Sis", etc. for in-the-home terms), "Identity/Type of Application Program(s) to Run" (e.g., values for this qualitative information may identities include productivity software such as "Word", "Outlook", "Power Point", etc. in business terms, and types such as "Productivity", "Educational", "Games", etc. for in-the-home terms), "Identity of Operating System to Install", and "Grade Point Average (GPA) of User Attending School".

The use of qualitative information gives a more qualitative feeling to the process for logically partitioning a computer system. Utilization of user-familiar terms will have appeal to users and be more valuable to users as they are deciding which factors are important in determining the characteristics of each logical partition in a computer system.

During a first phase, which is a training phase, a resource assignment mechanism for assigning computer resources to logical partitions in a multipartitioned computer system in accordance with the preferred embodiments of the present invention will collect data points showing how computer resource usage in a logical partition increases/decreases as the business demand (assuming, for example, the logical partition is utilized by a business supporting an increasing/decreasing number of customers) increases/decreases. To define the qualitative information that is pertinent to the logical partition, the resource assignment mechanism may initially present the user (e.g., an employee of the business) with a dialog to set up one or more usage constraints he/she considers important. Such usage constraints may include, for example, the "number of customers supported by the business" and the "priority of work". Then, the resource assignment mechanism will periodically (or non-periodically) present the user with dialogs to enter the qualitative information, and the logical partition's resource usage at that moment will be gathered and recorded along with the qualitative information. For example, during the training phase, as the number of customers supported by the business increases from "100" to "200" and the priority of work remains "critical" (these values are qualitative information input by the user), the average and maximum processor usage in the logical partition utilized by the business may increase from 15% and 25% of a 2.0 processing unit assignment (PUA), respectively, to 50% and 75% of the 2.0 processing unit assignment (PUA), respectively, and the maximum memory usage increases from 25% to 75% of 1 GB (these values are computer resource usage data gathered at the direction of the resource assignment mechanism). After enough data points are collected, the resource assignment mechanism computes one or more conversion functions that can be used to translate the qualitative information into computer resource assignments. For instance, the following conversion functions are illustrative:

Processing unit assignment (PUA)=$F_1$(number of customer supported by the business, priority of work);

Memory=$F_2$(number of customers supported by the business, priority of work).

These conversion functions will readily capture the trends encountered during the training phase. This training phase need not end before a second phase, described further below, begins. Continuing the training phase beyond the start of the second phase will allow the resource assignment mechanism to collect additional data points, possibly obtain new usage constraints from the user, and even fine-tune the conversion functions.

During the second phase, which is a partition creating/changing phase, the user is able to create logical partitions or change (or "tune") the computer resources of his/her existing partitions merely by inputting the qualitative information. That is, during the second phase, the resource assignment mechanism will present the user with a dialog to enter the then-current qualitative information. The resource assignment mechanism will then calculate the resource assignment based on the then-current qualitative information and the conversion functions (calculated in the training phase). The resource assignment calculated by the resource assignment mechanism need not be confined to physical resources, but can extend to virtual resources (e.g., carving a processor into 5 virtual processors, for instance). Also at this point in time, validation of the executability and/or advisability of the calculated resource assignment may occur and/or feedback to the user may be provided regarding the calculated resource assignment.

When automated partitioning capability is provided in conventional logical partitioning management approaches, this capability is typically reactive rather than proactive. In a typical reactive automated partitioning scheme, an agent detects over-utilization of a resource in a partition and then assigns more of the resource to the partition. In accordance with the preferred embodiments of the present invention, an automated partitioning capability may be made more proactive in that it can base its decisions and resource assignment in qualitative information input by the user from the moment a logical partition is created.

A computer system implementation of the preferred embodiments of the present invention will now be described with reference to FIG. 1 in the context of a particular computer system 100, i.e., an IBM System i computer system. However, those skilled in the art will appreciate that the method, apparatus, and computer program product of the present invention apply equally to any computer system, regardless of whether the computer system is a complicated multi-user computing apparatus (e.g., an IBM POWER6 processor-based server system or an IBM POWER6 processor-based blade system residing in an IBM BladeCenter chassis), a single user workstation, a PC, or an embedded control system. As shown in FIG. 1, computer system 100 comprises one or more processors 101A, 101B, 101C and 101D, a main memory 102, a mass storage interface 104, a display interface 106, a network interface 108, and an I/O device interface 109. These system components are interconnected through the use of a system bus 110.

Partition management code 122, described further below, resides in the main memory 102 and performs a number of multipartitioning functions and services for a plurality of partitions in the computer system 100.

In accordance with the preferred embodiments of the present invention, a qualitative resource assignment wizard 124, described further below, resides in the main memory 102 (at least in the embodiment shown in FIG. 1) and is a component of, or operates in conjunction with, the partition management code 122 to assign computer resources to one or more of the partitions based on qualitative information and a set of conversion functions. (One skilled in the art will appreciate that the qualitative resource assignment wizard 124 need not reside in the main memory 102 of the computer system 100. For example, in the embodiment shown in FIG. 5, the qualitative resource wizard 124 resides in the memory of a hardware management console (HMC) 520.) The qualitative information may be input by a user, for example, utilizing a graphical user interface (GUI) during a partition creating/changing phase (described further below with reference to FIG. 7). For example, in the embodiment shown in FIG. 14, the user inputs qualitative information (in this embodiment, the "Customers") into a Qualitative Resource Assignment (QRA) Create New Partition GUI. Also in accordance with the preferred embodiments of the present invention, the qualitative resource assignment wizard 124 calculates the conversion function during a training phase (described further below with reference to FIG. 6), in which the user periodically provides qualitative information while computer resource usage data is gathered. For example, in the embodiment shown in FIGS. 10 and 11, the user periodically inputs qualitative information (in this embodiment, the "Number of Customers" and "Priority") into a Qualitative Resource Assignment (QRA) Data Collection GUI.

Also, in accordance with the preferred embodiments of the present invention, the qualitative resource assignment wizard 124 includes a validation/feedback mechanism 126, described further below, that validates the executability and/or advisability of the assignment of computer resources to the individual partitions and/or provides feedback to the user regarding the assignment. For instance, the user may be provided with prompts indicating the assignment is above a maximum capacity currently available. In this regard, the prompts may also inform the user that more capacity will become available later (e.g., during non-peak hours), and query the user whether he/she desires to retry at that time or to change the value he/she input for the qualitative information. Also, the user may be provided with a prompt suggesting an alternative value for the qualitative information that would generate an assignment below the maximum capacity currently available. In a first example, if one of the usage constraints is the "Number of Customers", a prompt may suggest inputting a particular value for the qualitative information that would generate an assignment safely below the maximum capacity currently available. In a second example, if one of the usage constraints is the "Identity of Application Program(s) to Run", a prompt may suggest running an alternative application program that would generate an assignment safely below the maximum capacity currently available.

Generally, the feedback provided by the validation/feedback mechanism 126 may be based on any number and combination of factors, e.g., "time" and "priority". For example, the user may be provided with a prompt indicating that a system backup (which the user indicated has having a "low" priority) takes a long time and suggesting that the backup is best performed during non-peak hours, such as at night. In another example, if one of the usage constraints is the "Identity of User", certain users (e.g., value="Junior" or "Sis") may receive a smaller maximum available resource assignment than that available to other users (e.g., value="Mom" or "Dad"). In still another example, if the usage constraints include the "Identity of User", "Grade Point Average (GPA) of User Attending School", and "Type of Application Program to Run", certain users (e.g., value="Junior" or "Sis") may receive a smaller-than-usual maximum available resource assignment if that user has a GPA below a predefined threshold (e.g., value<"C") and that user is attempting to run a non-educational type of program (e.g., value="Game").

Figure 1:
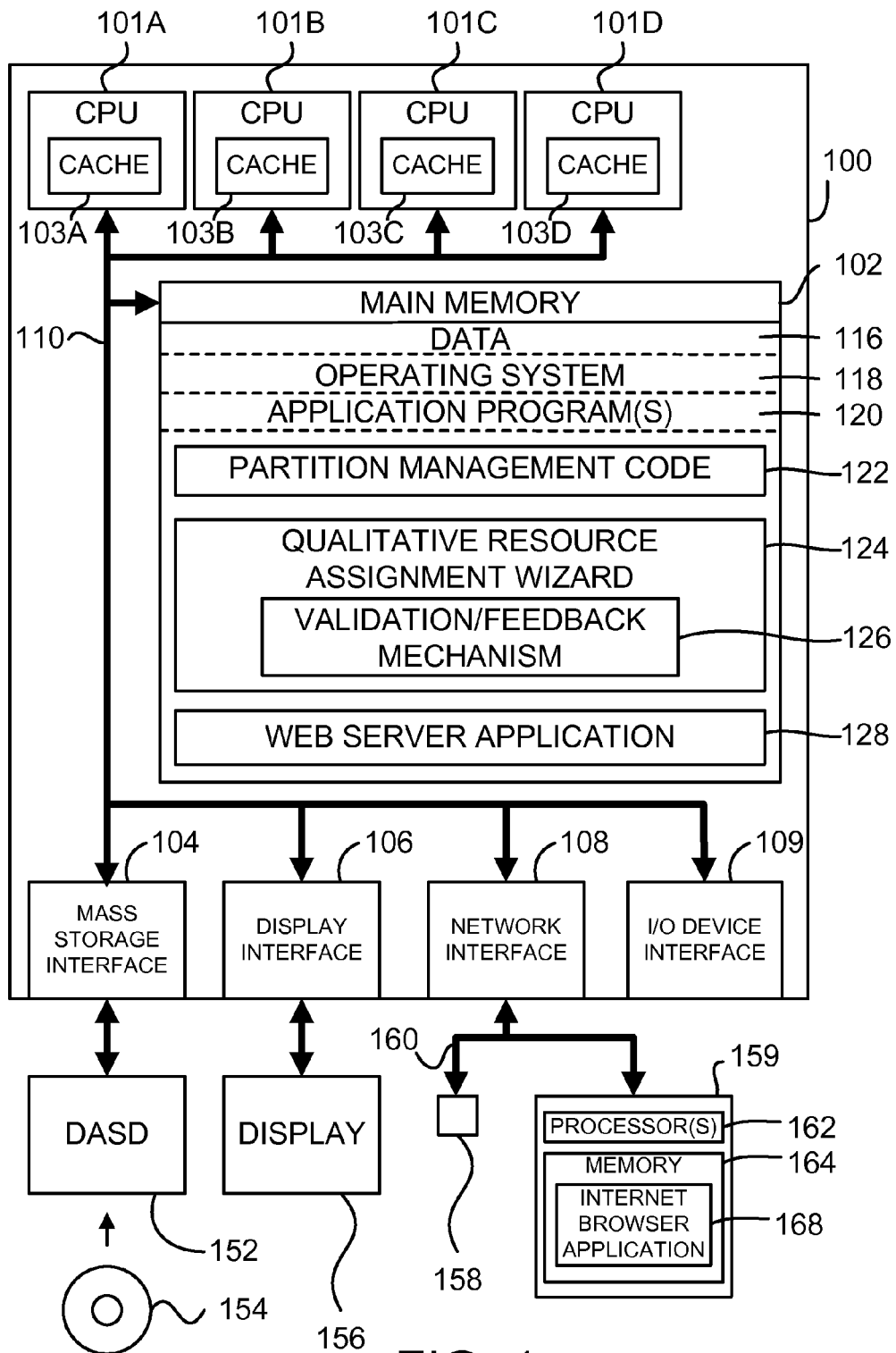
FIG. 1 is a block diagram illustrating a computer apparatus for implementing a mechanism for assigning computer resources to logical partitions in a multipartitioned computer system using qualitative information and at least one conversion function in accordance with the preferred embodiments of the present invention.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software (e.g., one or more application programs 120), utilities and other types of software. In addition, main memory 102 includes the partition management code 122 and the qualitative resource assignment wizard 124 (with the validation/feedback mechanism 126), each of which may in various embodiments exist in any number. (One skilled in the art will appreciate that the qualitative resource assignment wizard 124 need not reside in the main memory 102 of the computer system 100. For example, in the embodiment shown in FIG. 5, the qualitative resource wizard 124 resides in the memory of a hardware management console (HMC) 520.) Optionally, the main memory 102 may also include a web server application 128. Each of these entities in memory is described further below.

Although the partition management code 122, the qualitative resource assignment wizard 124, and the validation/feedback mechanism 126 are illustrated as being contained within the main memory 102, in other embodiments some or all of them may be on different electronic devices and may be accessed remotely (e.g., via a network 160). Thus, for example, the qualitative resource assignment wizard 124 and/or the validation/feedback mechanism 126 may be at least partially located or implemented on a networked device (e.g., a computer system, such as a workstation 158 and/or a client system 159), while the partition management program 122 resides on the computer system 100.

The preferred embodiments expressly extend to the qualitative resource assignment wizard 124 and/or the validation/ feedback mechanism 126 being implemented in a hardware management console (e.g., the hardware management console 520 shown in FIG. 5) within the scope of the preferred embodiments. As described further below, a hardware management console is typically coupled to one or more multi-partitioned servers over a service network.

In accordance with the preferred embodiments of the present invention, the computer system 100 may be a server system connected to a client system 159 across a network 160. The client system 159 (if present) includes one or more processors 162 and a memory 164. The memory 164 has stored therein, a least at various times, an internet browser application 168 providing the client system 159 the ability to remotely access data, applications and other types of software (e.g., the partition management code 122, the qualitative resource assignment wizard 124, and/or the validation/feedback mechanism 126) located on the server 100. For example, the internet browser application 168 (e.g., HTTP-based, HTTPS-based, etc.) may transfer files and data via the web server application 128 of the server 100. The user, once the partition management code 122, the qualitative resource assignment wizard 124, and/or the validation/feedback mechanism 126 is/are accessed, can remotely input the qualitative information. The internet browser application 168 of the client system 159 may then transfer the remotely input qualitative information to the server 100. One skilled in the art will appreciate, however, that utilization of an internet browser application is merely exemplary. Suitable alternatives include green screen, VNC (virtual network computing), etc.

The web server application 128 may include any suitable web server programming that enables access and data exchange with the client system 159. For example, the web server application 128 may supply software code associated with the partition management code 122, the qualitative resource assignment wizard 124, and/or the validation/feedback mechanism 126 to the client system 159 in the form of an applet, plug-in, or the like for viewing and/or interaction by the user at the client system 159. Additionally, while the above exemplary embodiment of the present invention describes the client system 159 as including the internet browser application 168 and the server 100 as including the web server application 128, one skilled in the art would recognize that any type of monolithic application could be employed, using suitable protocols, at both the server 100 and the client system 159, that would enable the user to remotely input qualitative information.

The partition management code 122 represents any code that is responsible for performing multipartitioning functions and services for partitions in the computer system 100. The partition management code 122 may be, for example, a "hypervisor", which is available from International Business Machines Corporation.

While the partition management code 122 is shown in FIG. 1 as a separate entity in memory, the preferred embodiments expressly extend to the partition management code 122 being implemented within the operating system 118, application software, utilities, or other types of software within the scope of the preferred embodiments. For example, the partition management code 122 may be a layer of the operating system 118 responsible for performing multipartitioning functions.

The partition management code 122 may comprise computer executable instructions maintained, for example, as a computer program product stored on a hard disk (e.g., on a DASD device 152) or system firmware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

In another embodiment, the partition management code 122 may be implemented in hardware via logic gates and/or other appropriate hardware techniques in lieu of, or in addition to, a processor-based system.

In the preferred embodiments of the present invention, the qualitative resource assignment wizard 124 (as well as the validation/feedback mechanism 126) includes instructions capable of executing on the processors 101 or statements capable of being interpreted by instructions executing on the processors 101 to perform the functions as further described below with reference to FIGS. 6-12 and 14. Also in accordance with the preferred embodiments of the present invention, the qualitative resource assignment wizard 124 (as well as the validation/feedback mechanism 126) may be instructions capable of executing on one or more processors of a networked device (e.g., the processor(s) 162 of the client system 159 (shown in FIG. 1) or the processor(s) 516 of the hardware management console 518 (shown in FIG. 5)) or statements capable of being interpreted by instructions executing on such processor(s) of the networked device to perform the functions as further described below with reference to FIGS. 6-12 and 14.

While the qualitative resource assignment wizard 124 is shown in FIG. 1 as a separate entity in memory, the preferred embodiments expressly extend to the qualitative resource assignment wizard 124 (and/or the validation/feedback mechanism 126) being implemented within the partition management code 122, application software, utilities, or other types of software within the scope of the preferred embodiments. For example, the qualitative resource assignment wizard 124 may be a component of the partition management code 122.

The qualitative resource assignment wizard 124 may comprise computer executable instructions maintained, for example, as a computer program product stored on a hard disk (e.g., on a DASD device 152) or system firmware. As mentioned above, firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

In another embodiment, the qualitative resource assignment wizard 124 and/or the validation/feedback mechanism 126 may be implemented in hardware via logic gates and/or other appropriate hardware techniques in lieu of, or in addition to, a processor-based system.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, application program(s) 120, partition management code 122, qualitative resource assignment wizard 124, and validation/feedback mechanism 126, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100.

Operating system 118 is a multitasking operating system known in the industry as IBM i (formerly IBM i5/OS); however, those skilled in the art will appreciate that the spirit and scope of the present invention is not limited to any one operating system. There are many suitable multitasking operating systems, such as AIX, Linux, etc. The operating system 118, which is located in a single partition, is preferably designed to interface with open firmware, such as partition management firmware (e.g., a hypervisor, available from International Business Machines Corporation).

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load computing-intensive processing from processors 101. However, those skilled in the art will appreciate that the present invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD-RW drive, which may store data to and read data from a CD-RW 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators" and "developers") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems (such as the workstations 158 and/or the client systems 159) to computer system 100 across a network 160. In accordance with the preferred embodiments of the present invention, these networked computer systems, like the client system 159, may include a computer system on which a web browser program resides by which the qualitative resource assignment wizard 124 and the validation/feedback mechanism 126 may be accessed.

Figure 5:
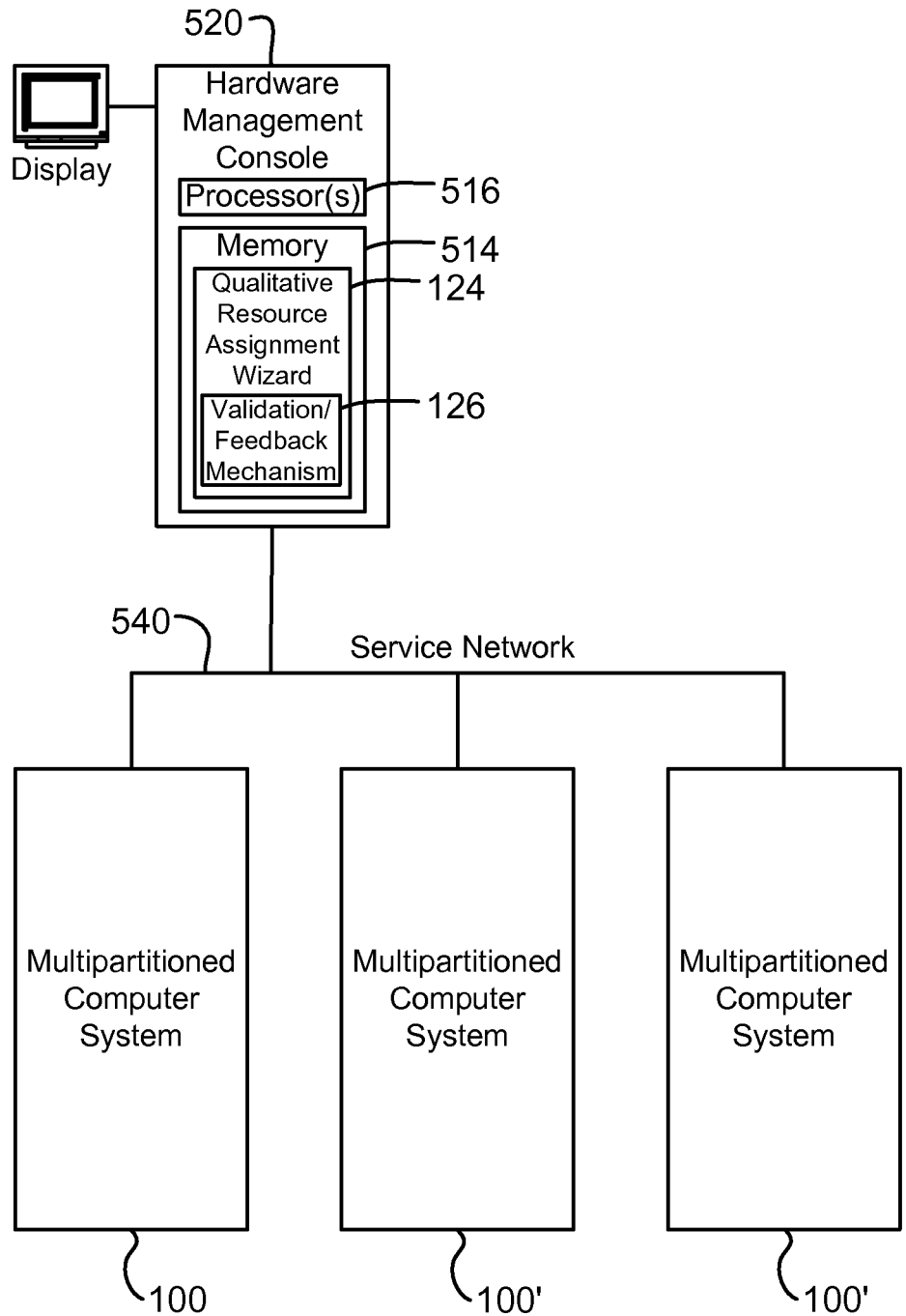
FIG. 5 is a block diagram illustrating a computer apparatus for implementing a mechanism for assigning computer resources to logical partitions in one or more multipartitioned computer systems using qualitative information and at least one conversion function in accordance with the preferred embodiment of the present invention, wherein the computer systems are managed by a hardware management console (HMC).

Also, in accordance with the preferred embodiments of the present invention, these networked computer systems may include a computer system on which a hardware management console (HMC) resides. In such HMC-managed systems, as shown in FIG. 5, the qualitative resource assignment wizard 124 and/or the validation/feedback mechanism 126 may be integrated into, or operate in conjunction with, the hardware management console in lieu of residing in the main memory 102 of the computer system 100 (as shown in FIG. 1).

The present invention applies equally no matter how computer system 100 may be connected to other computer systems (such as the workstations 158 and/or the client systems 159), regardless of whether the network connection 160 is made using present-day analog and/or digital techniques or via some networking mechanism of the future. In addition, many different network protocols can be used to implement network 160. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while the description above is in the context of a fully functional computer system, those skilled in the art will appreciate that the qualitative resource assignment wizard 124 and the validation/feedback mechanism 126, as well as the other software type entities described herein may be distributed as an article of manufacture (also referred to herein as a "computer program product") in a variety of forms, and the claims extend to all suitable types of computer-readable media used to actually carry out the distribution, including recordable type media such as floppy disks and CD-RWs (e.g., CD-RW 154 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Operations of the different partitions in the computer system 100 may be controlled through a hardware management console (HMC), such as the hardware management console 520 (shown in FIG. 5). Hardware management console 518 is a separate computer system from which a system administrator, for example, may perform various functions including assignment of hardware resources to each logical partition, as well as reassignment of resources to different partitions. IBM POWER6 processor-based systems, for example, can be managed by an HMC. Note that the term hardware management console (HMC) is used herein in a very broad sense to include any system and logical partition management utility that may be used to manage a logically partitioned computer system. Thus, as used herein the term HMC refers to any administrative console that communicates with firmware via APIs (application programming interfaces).

As noted above, in lieu of the qualitative resource assignment wizard 124 and/or the validation/feedback mechanism 126 residing in the main memory 102 of the computer system 100 (as shown in FIG. 1), the qualitative resource assignment wizard 124 and/or the validation/feedback mechanism 126 may reside in a memory and be executed by one or more processors of the HMC 520 (as described further below with reference to FIG. 5).

For example, in the HMC-managed embodiment shown in FIG. 5, the qualitative resource assignment wizard 124 and the validation/feedback mechanism 126 reside in a memory 514 and are executed by one or more processors 516 of a computer system that comprises the hardware management console 520. The HMC 520 is connected to the multipartitioned computer system 100 (and to the other multipartitioned computer systems 100') by a service network 540.

In accordance with the preferred embodiments of the present invention, with the qualitative resource assignment wizard 124 residing in memory on the HMC 520 (or other administrative console), the user at HMC 520 can utilize a graphical user interface (GUI) provided by the qualitative resource assignment wizard 124, as described further below with reference to FIGS. 6-12 and 14, to input qualitative information (e.g., "Number of Transactions per Minute", "Number of Customers" and "Priority"). In general, the qualitative resource assignment (QRA) wizard code can be in multiple disparate areas (not just the main memory of the HMC 520). For example, the QRA wizard may be integrated with storage management, DBMS (database management system), etc. Also, one skilled in the art will appreciate that the mechanism by which the user inputs data need not be graphical. Preferably, the user inputs qualitative information both during a training phase and a partition creating/changing phase. During the training phase, the qualitative resource assignment wizard 124 calculates a set of conversion functions using the qualitative information periodically input by the user and computer resource usage data gathered when the user invokes collection. During the partition creating/changing phase, the qualitative resource assignment wizard 124, in conjunction with the partition management code 122, uses the qualitative information and the conversion functions to assign computer resources to one or more of the partitions. Also in accordance with the preferred embodiments of the present invention, the validation/feedback mechanism 126 ensures the executability and/or advisability of the assignment of computer resources to the individual partition and/or provides feedback to the user regarding the assignment. In the above-described HMC-managed embodiment, both the qualitative resource assignment wizard 124 and the validation/feedback mechanism 126 preferably reside in memory 514 on the HMC 520.

In a modification of the above-described HMC-managed embodiment, the qualitative resource assignment wizard 124 and/or the validation/feedback mechanism 126 may reside in memory and be executed by processor(s) of one or more additional computer systems (not shown) connected indirectly to the multipartitioned computer system 100 (and to the other multipartitioned computer systems 100') through the HMC 520 (or other administrative console). For example, the qualitative resource assignment wizard 124 and/or the validation/feedback mechanism 126 may run within IBM Systems Director, which typically resides on a computer system networked to the HMC 520. IBM Systems Director is an integrated suite of tools that provides a platform management foundation for managing physical and virtual systems across a multi-system environment.

Figure 6:
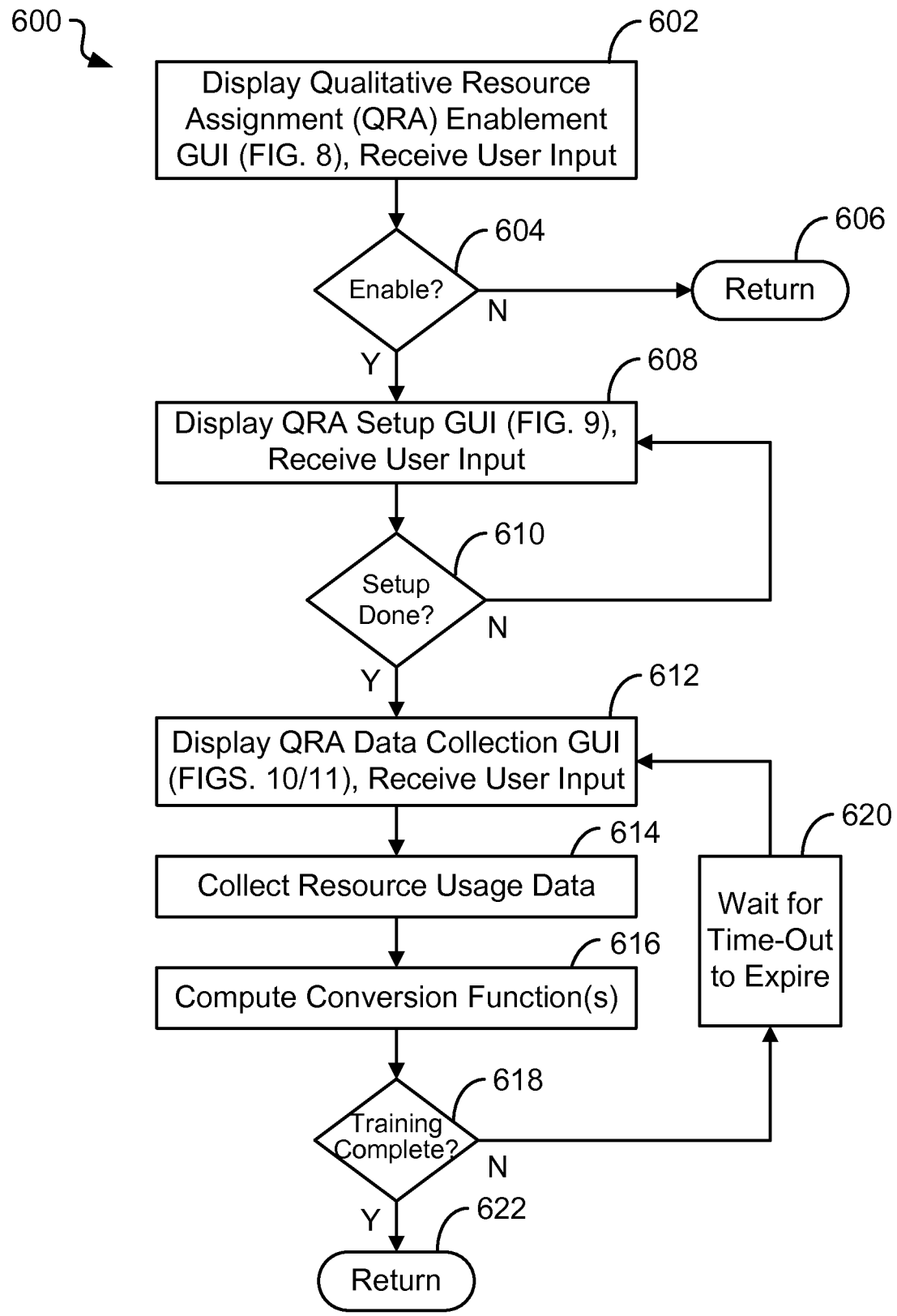
FIG. 6 is a flow diagram illustrating a method for assigning computer resources to logical partitions in a multipartitioned computer system using qualitative information and at least one conversion function during a training phase in accordance with the preferred embodiments of the present invention.

FIG. 6 is a flow diagram illustrating a method 600 for assigning computer resources to logical partitions in a multi-partitioned computer system using qualitative information and at least one conversion function during a training phase in accordance with the preferred embodiments of the present invention. In the method 600, the steps discussed below (steps 602-622) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the steps discussed below (steps 602-622) are performed during a training phase, i.e., when the qualitative resource assignment wizard is being trained. In accordance with the preferred embodiments of the present invention, these steps are preformed before a partition creating/changing phase (described further below with reference to FIG. 7). However, at least some of these steps (e.g., step 614, 616, etc.) typically occur after a logical partition has been brought into existence. Hence, such steps may be performed, for example, after a conventional logical partition deployment (e.g., assignment of hardware resources to each logical partition). One skilled in the art will appreciate, however, that the QRA wizard may be working and gathering information in a stand-alone system (wherein the entire system in un-partitioned and behaves like a single partition that owns every resource).

Method 600 begins when the qualitative resource assignment wizard displays a graphical user interface (GUI) querying the user whether qualitative resource assignment is to be enabled for a given logical partition (step 602). For example, the Qualitative Resource Assignment (QRA) Enablement GUI 800 (shown in FIG. 8) may be displayed. The user may enable qualitative resource assignment by selecting the "Yes" button 802, or disable qualitative resource assignment by selecting the "No" button 804. This graphical "Yes"/"No" mechanism of QRA Enablement GUI 800 is merely an illustrative example of how a user may enable qualitative resource assignment. Indeed, enablement need not be graphical. In accordance with the preferred embodiments of the present invention, the Qualitative Resource Assignment (QRA) Enablement GUI may be provided on the display 156 (shown in FIG. 1) of the computer system 100, the display of the hardware management console 520 (shown in FIG. 5), or some other networked device (e.g., on a display of the client system 159 (shown in FIG. 1) or some other networked computer running a web browser application).

Next, the qualitative resource assignment wizard determines whether or not the user wishes to enable qualitative resource assignment (step 604). If the user does not wish for qualitative resource assignment to be enabled (step 604=No), the method 600 returns (step 606). On the other hand, if the user wishes for qualitative resource assignment to be enabled (step 604=Yes), the qualitative resource assignment wizard displays a GUI requesting the user to set up one or more usage constraints for the given logical partition (step 608). The usage constraints define information that is qualitative (e.g., "Number of Transactions per Minute", "Number of Customers" and "Priority") rather than computer science concepts that are commonly used in conventional logical partitioning management approaches, such as the "number of CPU's to move/add/remove", "amount of memory to move/add/remove", "adapters used by this partition", "free system adapters", etc. In general, the QRA wizard will have APIs (and documentation) that: 1) allow users to connect existing monitoring technology (CPU, I/O, etc.) to the QRA wizard to constantly feed data; and 2) allow users to define new usage constraints (e.g., "Energy Cost").

For example, during step 608 the qualitative resource assignment wizard may display the Qualitative Resource Assignment (QRA) Setup GUI 900 (shown in FIG. 9). Through interaction with the QRA Setup GUI 900, the user sets up one or more usage constraints. Although two usage constraints are shown in FIG. 9 (i.e., "Usage Constraint #1" and "Usage Constraint #2"), one skilled in the art will appreciate that any number of usage constraints may be displayed. In this embodiment, each usage constraint is defined by the user through entering information into various fields, such as a "Label" field 902, a "Type" field 904, and a "Values" field 906. For example, to set up "Usage Constraint #1" the user entered "Number of Customers" in the "Label" field 902 and selected "Numeric" in the "Type" field 904. On the other hand, to set up "Usage Constraint #2" the user entered "Priority" in the "Label" field 902, selected "Value from Set" in the "Type" field 904, and entered "High, Low, Medium" in the "Values" field 906. The inverted triangle in the "Type" field 904 indicates that the user may select from a number of items (e.g., "Numeric", "Value from Set", etc.) in a drop down menu. The user may originate the usage constraints and/or may select from a pre-populated list. Also, the user may add one or more new usage constraints by selecting the "Add New . . . " button 908. The user selects the "Done" button 910 when finished setting up the usage constraints.

Also, during step 608 the user may be requested to enter a periodicity value defining how often (e.g., once per day, once per week, once per month, once per quarter, twice per year, once per year, etc.) the user is to be requested to input qualitative information with respect to the usage constraints. One skilled in the art will appreciate, however, that the timing of the requests for the user to input this qualitative information may be non-periodic. For example, during step 608 the user may be requested to schedule the timing of these requests on a calendar. Alternatively, the timing between requests for the user to input this qualitative information may be predetermined and/or may be event driven. In addition, during step 608 the user may be requested to enter a duration value defining the duration of the training phase (e.g., one week, one month, one quarter, six months, one year, two years, three years, four years, five years, etc). Alternatively, the duration of the training phase may be predetermined and/or may be event driven, or even non-terminating. In general, during IPL (initial program load)/new version load/fix pack load, it is desirable for the user to be able to control whether or not all learned data is to be erased. Typically, the training phase should start from scratch again under these circumstances. Also, it is desirable for assignment information to be available to other subsystems so the requirements can be driven into a database optimizer, for instance.

Next, the qualitative resource assignment wizard determines whether or not the user has finished setting up the usage constraints (step 610). If the user has selected the "Add New . . . " button 908 (step 610=No), the method 600 returns to step 608. The qualitative resource assignment wizard may, for example, update the QRA Setup GUI 900 to include fields for an additional usage constraint. On the other hand, if the user had selected the "Done" button 910 (step 610=Yes), the qualitative resource assignment wizard displays a GUI requesting the user to input qualitative information for each of the usage constraints (step 612). The input mechanisms of QRA Setup GUI 900 are merely illustrative examples—there are other ways to set up the usage constraint(s).

Figure 10:
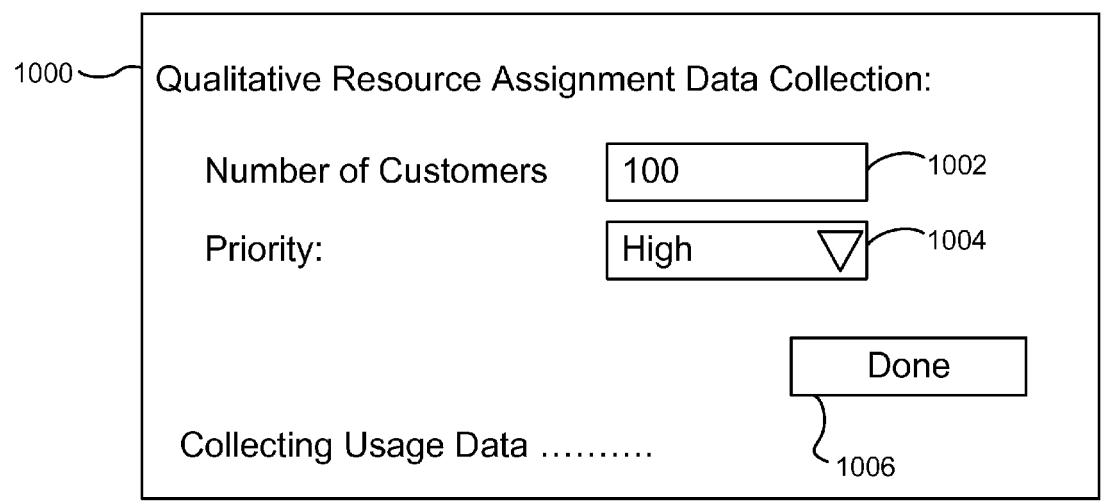
Figure 11:
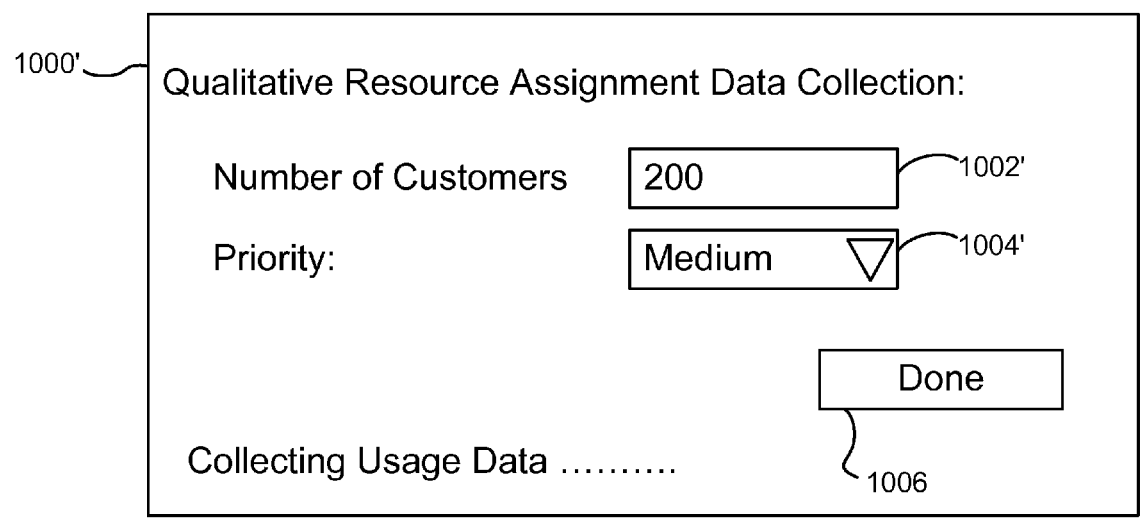

For example, during step 612 the qualitative resource assignment wizard may display the Qualitative Resource Assignment (QRA) Data Collection GUI (shown in FIGS. 10 and 11). Through repeated interaction with the QRA Data Collection GUI at different points in time, the user periodically (or non-periodically) inputs qualitative information with respect to the usage constraints set up earlier (in step 608). During the interaction with the QRA Data Collection GUI 1000 as illustrated in FIG. 10, the user inputs "100" in the "Number of Customers" field 1002 and selects the value "High" in the "Priority" field 1004. These are the two usage constraints the user set up earlier (in step 608). The inverted triangle in the "Priority" field 1004 indicates that the user may select from a number of values (e.g., "High", "Low" and "Medium) in a drop down menu. The user selects the "Done" button 1006 when finished inputting the qualitative information. The input mechanisms of QRA Data Collection GUI 1000 are merely illustrative examples—there are other ways to collect the qualitative information.

Next, the qualitative resource assignment wizard gathers computer resource usage data for the given logical partition (step 614). In general, the computer resource usage data may be streamed or input, as may be the qualitative information. The computer resource usage data gathered may, for example, include energy cost, processor usage data (e.g., the number of processors assigned to the given logical partition, the average percentage usage, the maximum percentage usage), memory usage data (e.g., amount of memory assigned to the given logical partition, the average percentage usage, etc.), and I/O usage data (e.g., specific I/O slots assigned to the given logical partition). The computer resource usage data is preferable gathered at a point in time substantially coincident with the user's input of the qualitative information (in step 612). For example, the computer resource usage data may be gathered immediately after the user selects the "Done" button 1006 when finished inputting the qualitative information (in step 612). Alternatively, as implied by the message "Collecting Usage Data . . . " near the bottom of the QRA Data Collection GUI 1000, the computer resource usage data may be collected while the user inputs the qualitative information (in step 612). This too is merely one way to do it—in general, there are other ways to assign, define, collect, etc.

Next, the qualitative resource assignment wizard computes one or more conversion functions (step 616). The conversion function(s) is/are computed based on the qualitative information input by the user (in step 612) and the computer resource usage data gathered (in step 614) over multiple points in time. Preferably, the computation of the conversion function(s) (in step 616) is deferred until a sufficient number of data points (i.e., the qualitative information and the computer resource usage data) have been collected to allow application of a data fitting method or other conventional statistical analysis (described further below with reference to FIG. 12).

The method 600 continues with the qualitative resource assignment wizard determining whether or not the training phase has been completed (step 618). For example, the training phase may be complete when a sufficient number of data points have been collected to allow application of a data fitting method or other conventional statistical analysis. One skilled in the art will appreciate, however, that the QRA wizard may keep training after the first training only phase in order to refine the conversion function(s).

If the training phase is not complete (step 618=No), the qualitative resource assignment wizard waits for the expiration of a time-out value (step 620). For example, the time-out value may be a user defined (e.g., in step 608) periodicity value (or a user-scheduled non-periodic timing), predetermined, or event driven. After expiration of the time-out value, the method 600 returns to step 612. For example, the qualitative resource assignment wizard may again display the Qualitative Resource Assignment (QRA) Data Collection GUI 1000'. During the interaction with the QRA Data Collection GUI 1000' as illustrated in FIG. 11, the user inputs "200" in the "Number of Customers" field 1002' and selects the value "Medium" in the "Priority" field 1004'.

If the training phase is complete (step 618=Yes), the method 600 returns (step 622).

Figure 12:
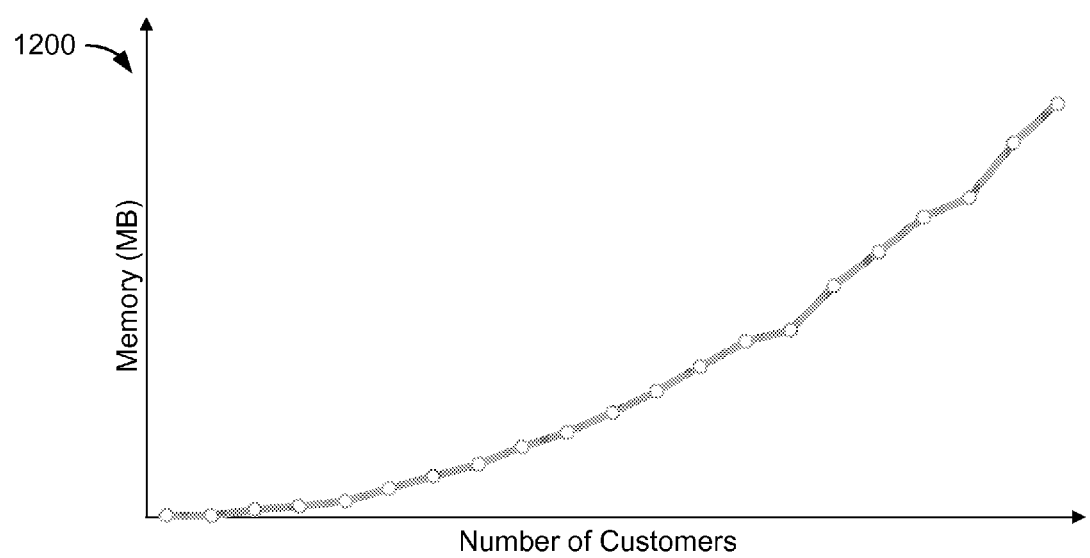
FIG. 12 is a graph illustrating an exemplary functional relationship between computer resource usage data (i.e., memory) and qualitative information (i.e., the number of customers).

FIG. 12 is a graph 1200 illustrating an exemplary functional relationship between computer resource usage data (i.e., "Memory") and qualitative information (i.e., the "Number of Customers"). For the sake of clarity, only one of the two usage constraints from the embodiment described above is plotted on the graph 1200. That is, while the "Number of Customers" usage constraint is plotted, the "Priority" usage constraint is not. This results in a simplified 2-dimensional example ("Memory" vs. "Number of Customers"), rather than the more typical multi-dimensional plot. Using a conventional data fitting method, the conversion function for this simplified 2-dimensional example is computed as:

$$f(x)=c_1x^n+c_2x^{n-1}+\ldots c_nx;$$

where f(x) is the amount of memory (in megabytes) and x is the number of customers. The constants $c_1, c_2, \ldots, c_n$ are computed according to the conventional data fitting method. One skilled in the art will appreciate, however, that the conversion function may be computed using other data fitting methods. In general, any suitable data fitting method or conventional statistical analysis technique may be used to compute the conversion function(s). Moreover, f(x) is merely a polynomial approximation shown as an example; many other suitable approximation methods exist (logarithmic, etc.). Also, a "language" may be made available that allows users to define new functions.

Preferably, a conversion function is computed for each system resource (e.g., memory, processors, etc.). Typically, each conversion function is multi-dimensional. For example, the conversion functions for memory and processors in a multi-dimensional example may be expressed as:

$$F_1(x_1, x_2, \ldots x_m);$$

$$F_2(x_1, x_2, \ldots x_m);$$

where the conversion function $F_1(x_1, x_2, \ldots x_m)$ is for processors, the conversion function $F_2(x_1, x_2, \ldots x_m)$ is for memory, and $x_1, x_2, \ldots x_m$ are qualitative information values ("Number of Customers", "Priority", "Number of Transactions per Minute", etc.).

Figure 7:
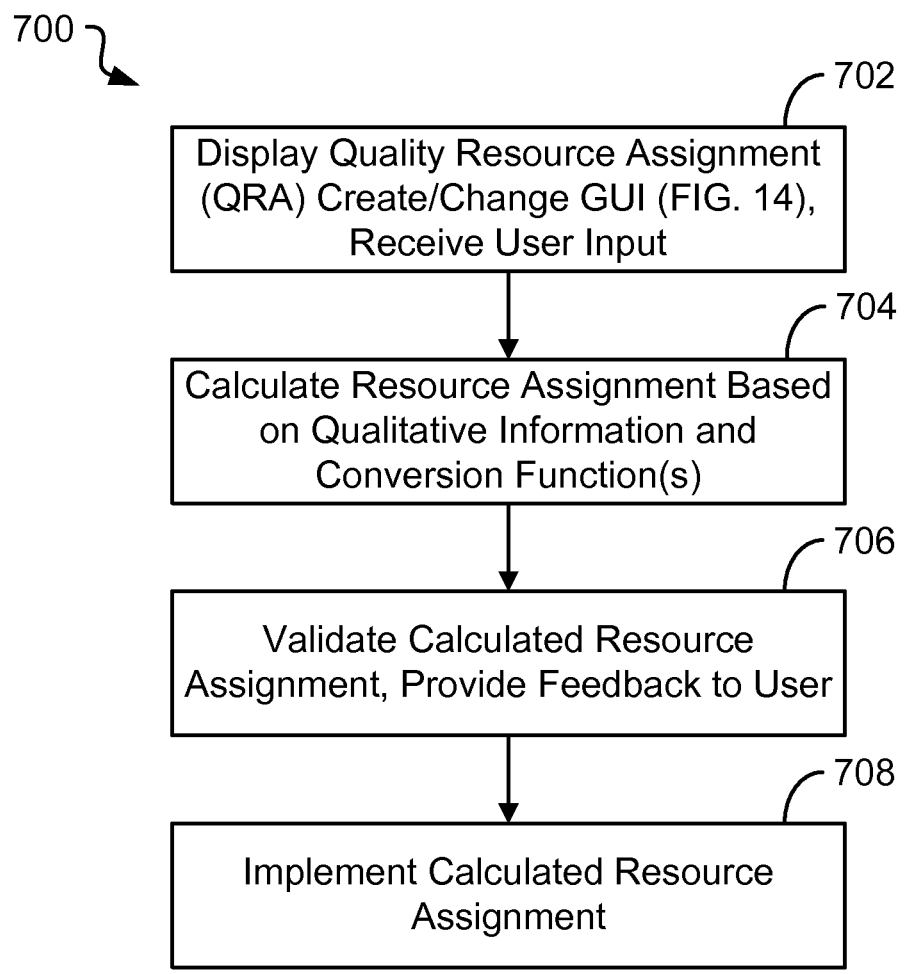
FIG. 7 is a flow diagram illustrating a method for assigning computer resources to logical partitions in a multipartitioned computer system using qualitative information and at least one conversion function during a partition creating/changing phase in accordance with the preferred embodiments of the present invention.
Figure 8:
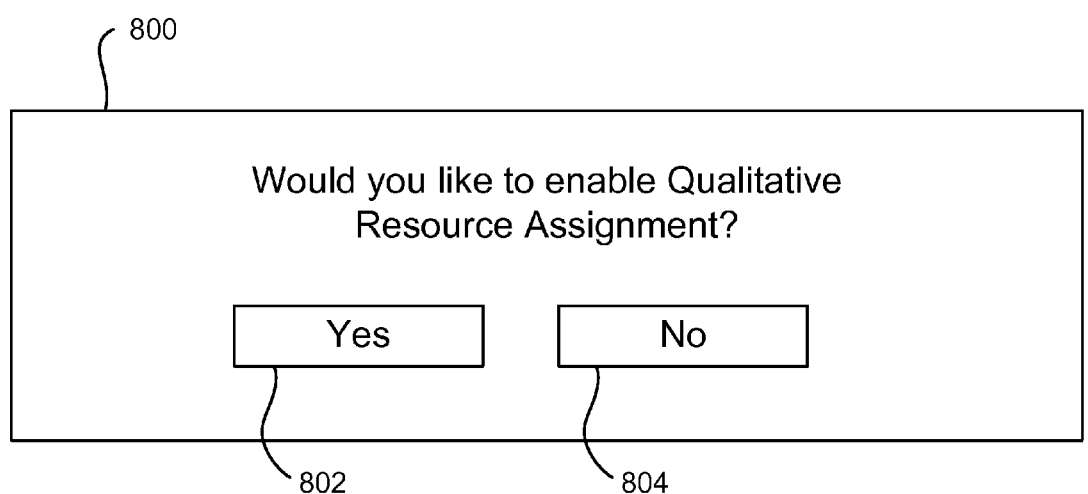

FIG. 7 is a flow diagram illustrating a method 700 for assigning computer resources to logical partitions in a multi-partitioned computer system using qualitative information and at least one conversion function during a partition creating/changing phase in accordance with the preferred embodiments of the present invention. In the method 700, the steps discussed below (steps 702-708) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the steps discussed below (steps 702-708) are performed during a partition creating/changing phase, i.e., when the qualitative resource assignment wizard, in conjunction with the hypervisor, assigns computer resources to a new logical partition or changes the assignment of computer resources in an existing logical partition using qualitative information and at least one conversion function. Alternatively, there need not be a partition. In accordance with the preferred embodiments of the present invention, these steps are preformed after the training phase (described above with reference to FIG. 6). However, these steps may be performed without benefit of the training phase utilizing at least one predetermined conversion function.

Method 700 begins when the qualitative resource assignment wizard displays a graphical user interface (GUI) requesting the user to input qualitative information (step 702). One skilled in the art will appreciate, however, that the mechanism by which the user inputs the qualitative information need not be graphical. During step 702 the user inputs qualitative information for one or more usage constraints, which in accordance to the preferred embodiments of the present invention was/were previously set up in the training phase. The qualitative information input by the user during step 702 pertains to a new logical partition that is to be created or an existing logical partition for which the assignment of computer resources may be changed.

Figure 14:
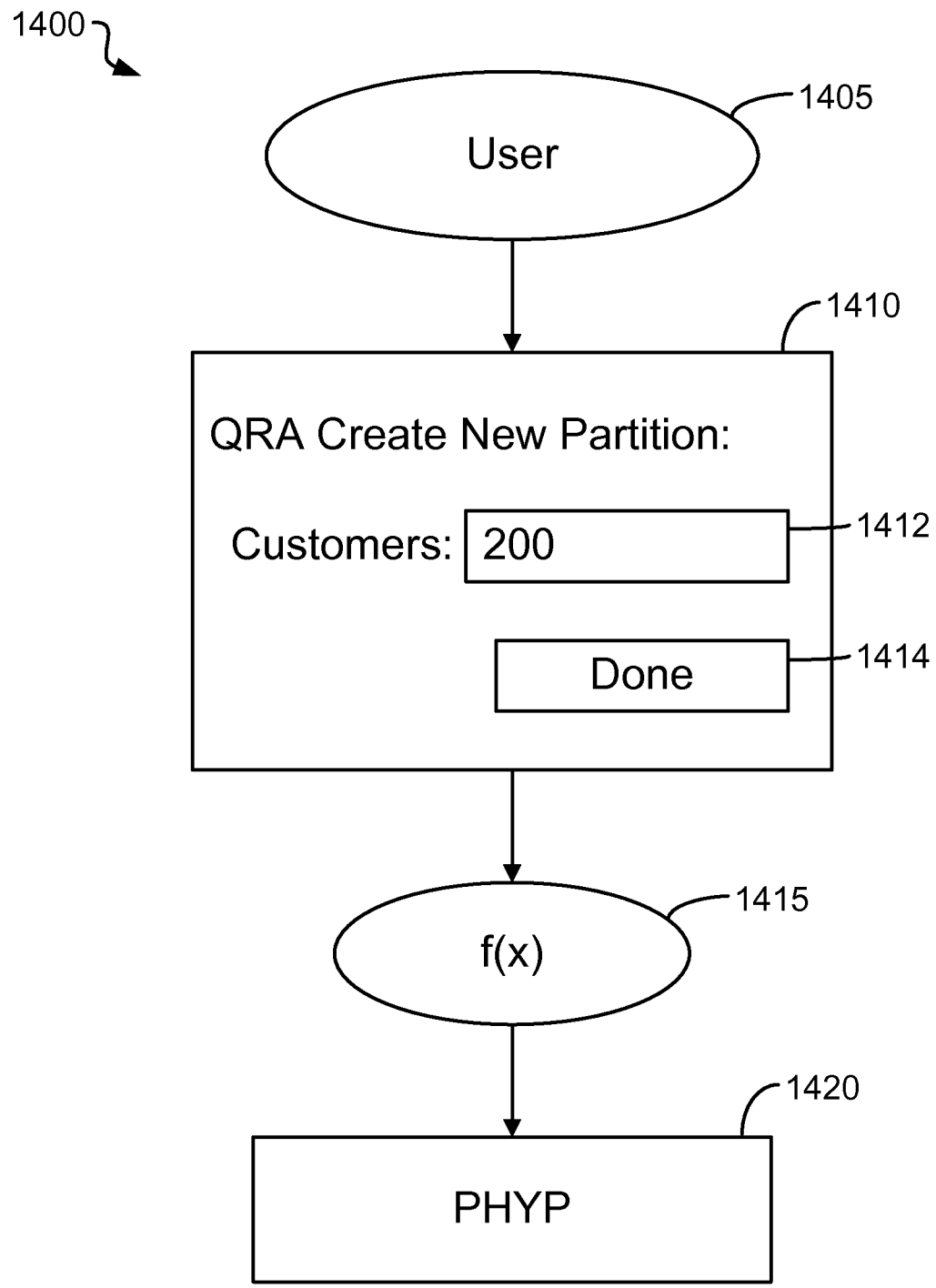
FIG. 14 is a flow diagram illustrating a method for assigning computer resources to logical partitions in a multipartitioned computer system using qualitative information and at least one conversion function in accordance with the preferred embodiments of the present invention.

For example, during step 702 a Qualitative Resource Assignment (QRA) Create New Partition GUI 1410 (shown in FIG. 14) may be displayed. Through interaction with the QRA Create New Partition GUI 1410, the user inputs qualitative information with respect to one or more usage constraints set up in the training phase. During the interaction with the QRA Create New Partition GUI 1410 as illustrated in FIG. 14, the user inputs "200" in the "Customers" field 1412. This corresponds to one of the two usage constraints the user set up earlier (e.g., at step 608 in the training phase). The user selects the "Done" button 1414 when finished inputting the qualitative information.

Next, the qualitative resource assignment wizard calculates the assignment of one or more computer resources in the new logical partition or calculates a change in the assignment of one or more computer resources in an existing logical partition (step 704). Alternatively, there need not be a partition. The qualitative assignment wizard calculates the computer resource assignment(s) based on the qualitative information input by the user (in step 702) and at least one conversion function computed earlier (e.g., at step 616 in the training phase). In accordance with the preferred embodiments of the present invention, a different conversion function is used in the calculation of each computer resource assignment calculated by the qualitative resource assignment wizard.

In an optional step, the method 700 continues with the validation/feedback mechanism, if present, validating each calculated computer resource assignment for the logical partition (step 706). The processing unit assignment (PUA) for the logical partition calculated in step 704 may be, for example, validated with respect to its executability and/or advisability. For example, step 706 may implement a validation scheme ensuring that the qualitative information input by the user would yield a logical partition having a processing unit assignment (PUA) at or below a maximum processing capacity currently available. The validation scheme may include feedback to and/or interaction with the user regarding the assignment (e.g., prompts via a qualitative resource assignment wizard GUI). For example, such prompts may inform the user that the processing unit assignment (PUA) for the logical partition is above a maximum processing capacity currently available. In this regard, the prompts may also inform the user that more processing capacity will become available later (e.g., during non-peak hours), and query the user whether he/she desires to retry at that time or to change the value he/she input for the qualitative information.

Finally, the computer resource assignment calculated by the qualitative resource assignment wizard (in step 704) is provided to the hypervisor, which then implements the calculated computer resource assignment (step 708).

Figure 13:
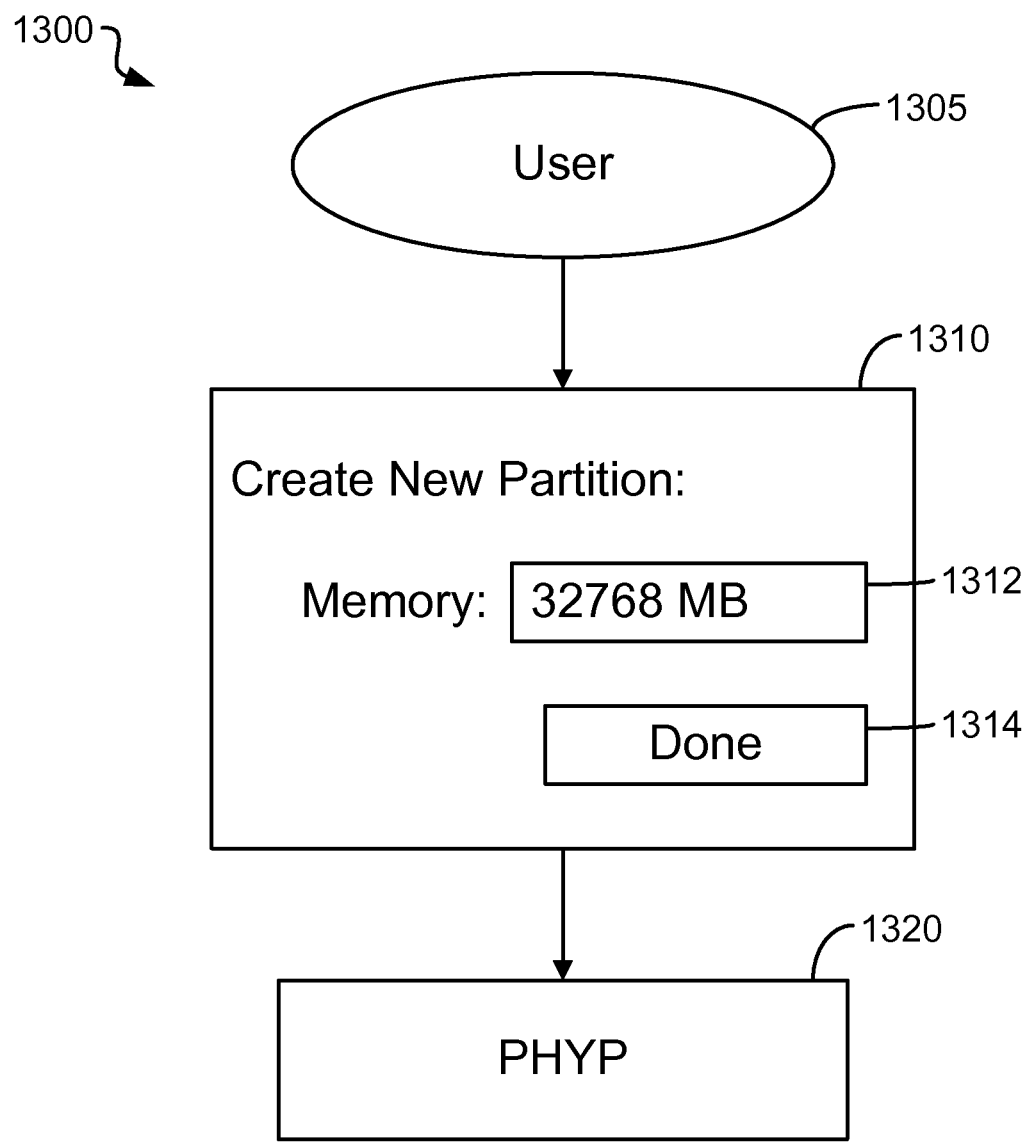
FIG. 13 is a flow diagram illustrating a prior art method for assigning computer resources to logical partitions in a multi-partitioned computer system.

FIGS. 13 and 14 help illustrate important differences between a typical prior art method for assigning computer resources to logical partitions in a multipartitioned computer system (FIG. 13) and a method for assigning computer resources to logical partitions in a multipartitioned computer system using qualitative information and at least one conversion function in accordance with the preferred embodiments of the present invention (FIG. 14). In accordance with the preferred embodiments of the present invention, as much of the technical jargon as possible is taken out of the process for partitioning a computer system, thereby assisting users that might not be familiar with the computer science concepts that are common in conventional partitioning processes.

FIG. 13 is a flow diagram illustrating a prior art method 1300 for assigning computer resources to logical partitions in a multipartitioned computer system. FIG. 13 includes a screen shot illustrating a prior art Create New Partition GUI 1310 for creating a new partition that requires a user 1305 to input computer resource information (i.e., the number of megabytes of memory, in this example). The computer resource information input by the user is then provided to partition management code, such as a Power hypervisor (PHYP) 1320. During the user's interaction with the prior art Create New Partition GUI 1310 as illustrated in FIG. 13, the user inputs "32768" in the "Memory" field 1312 and selects the "Done" button 1314 when finished. Hence, the user desires 32,768 megabytes of memory to be assigned to the logical partition. Entry of such computer resource information by the user disadvantageously requires an extremely high level of technical knowledge. Some users may not be familiar with such computer science concepts.

FIG. 14 is a flow diagram illustrating a method 1400 for assigning computer resources to logical partitions in a multipartitioned computer system using qualitative information and at least one conversion function in accordance with the preferred embodiments of the present invention. FIG. 14 includes a screen shot illustrating a Qualitative Resource Assignment (QRA) Create New Partition GUI 1410 for creating a new partition that requires a user to input qualitative information (i.e., the number of customers, in this example). The qualitative information input by the user is then plugged into a conversion function f(x) 1415 to arrive at a calculated computer resource assignment, which is then provided to partition management code such as a Power hypervisor (PHYP) 1420. During the user's interaction with the QRA Create New Partition GUI 1410 as illustrated in FIG. 14, the user inputs "200" in the "Customers" field 1412 and selects the "Done" button 1414 when finished. Unlike direct entry of computer resource information, the user's entry of such qualitative information does not require an extremely high level of technical knowledge. More savvy users can tailor their needs using provided APIs.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A computer system, comprising:
   at least one processor;
   a memory coupled to the at least one processor;
   a qualitative resource assignment wizard executed by one or more of the at least one processor, the qualitative resource assignment wizard receiving qualitative information for a given logical partition and calculating a computer resource assignment for the given logical partition based on the qualitative information and a conversion function, wherein the qualitative information is input by a user, and wherein the qualitative information input by the user includes at least one usage constraint selected from a group consisting of a number of customers, a number of transactions per unit time, an identity of a human user, a title of a human user, a grade point average of a human user attending school, and an energy cost;
   wherein the calculating a computer resource assignment includes calculating at least one of a processing unit assignment, a memory assignment, an I/O slot assignment for the given logical partition, and energy; and
   wherein the qualitative resource assignment wizard includes a validation/feedback mechanism that, before the calculated assignment is implemented, at least one of validates the executability of the calculated assignment, validates the advisability of the calculated assignment, and provides feedback to the user regarding the calculated assignment.

2. The computer system as recited in claim 1, wherein the qualitative information is provided by the user utilizing a graphical user interface (GUI), and wherein the qualitative information input by the user via the GUI includes at least two usage constraints comprising a number of customers and a priority.

3. The computer system as recited in claim 1, wherein the qualitative resource assignment wizard calculates the conversion function in a training phase, and wherein the training phase comprises receiving qualitative information for the given logical partition periodically or non-periodically input by the user over time on multiple occasions, gathering computer resource usage data for the given logical partition at a point in time substantially coincident with the user's input of the qualitative information, and computing the conversion function by applying a data fitting method or a statistical analysis technique to the qualitative information periodically or non-periodically input by the user over time on multiple occasions and the computer resource usage data gathered during the training phase.

4. The computer system as recited in claim 1, wherein the qualitative resource assignment wizard is a component of or operates in conjunction with partition management code executed by one or more of the at least one processor.

5. The computer system as recited in claim 1, wherein the computer system comprises an administrative console coupled to at least one multipartitioned server over a service network, the multipartitioned server containing one or more processors, memory, and one or more I/O slots assigned to a plurality of logical partitions.

6. The computer system as recited in claim 1, wherein the computer system comprises a server system connected to at least one client system over a network, wherein a network server application in the server system provides software code associated with the qualitative resource assignment wizard to the client system for enabling the user to remotely input the qualitative information, and wherein a browser application in the client system transfers the remotely input qualitative information to the server system.

7. A computer-implemented method for assigning a computer resource to a logical partition in a multipartitioned computer system, comprising the steps of:
   receiving qualitative information for a given logical partition, wherein the qualitative information is input by a user, and wherein the qualitative information input by the user includes at least one usage constraint selected from a group consisting of a number of customers, a number of transactions per unit time, an identity of a human user, a title of a human user, a grade point average of a human user attending school, and an energy cost; and
   calculating a computer resource assignment for the given logical partition based on the qualitative information and a conversion function, wherein the calculating step includes the step of calculating at least one of a processing unit assignment, a memory assignment, an I/O slot assignment for the given logical partition, and energy;

the computer-implemented method further comprising at least one of the steps of:
- validating the executability of the calculated assignment before the calculated assignment is implemented;
- validating the advisability of the calculated assignment before the calculated assignment is implemented; and
- providing feedback to the user regarding the calculated assignment before the calculated assignment is implemented.

8. The computer-implemented method as recited in claim 7, further comprising the step of:
displaying a graphical user interface (GUI) to the user by which the user inputs the qualitative information, wherein the qualitative information input by the user via the GUI includes at least two usage constraints comprising a number of customers and a priority.

9. The computer-implemented method as recited in claim 7, wherein the qualitative resource assignment wizard calculates the conversion function in a training phase, wherein the training phase comprises the steps of:
- receiving qualitative information for the given logical partition periodically or non-periodically input by the user over time on multiple occasions;
- gathering computer resource usage data for the given logical partition at a point in time substantially coincident with the user's input of the qualitative information; and
- computing the conversion function by applying a data fitting method or a statistical analysis technique to the qualitative information periodically or non-periodically input by the user over time on multiple occasions and the computer resource usage data gathered during the training phase.

10. The computer-implemented method as recited in claim 7, wherein the qualitative resource assignment wizard is a component of or operates in conjunction with partition management code executed by one or more of the at least one processor.

11. The computer-implemented method as recited in claim 7, wherein the receiving step and the calculating step are performed in an administrative console coupled to at least one multipartitioned server over a service network, the multipartitioned server containing one or more processors, memory, and one or more I/O slots assigned to a plurality of logical partitions.

12. The computer-implemented method as recited in claim 7, wherein the calculating step is performed in server system connected to at least one client system over a network, wherein a network server application in the server system provides software code associated with the qualitative resource assignment wizard to the client system for enabling the user to remotely input the qualitative information, and wherein a browser application in the client system transfers the remotely input qualitative information to the server system.

13. A computer program product for assigning a computer resource to a logical partition in a multipartitioned computer system, comprising:
a plurality of executable instructions provided on a computer readable recordable media, wherein the executable instructions, when executed by at least one processor in a digital computing device, cause the digital computing device to perform the steps of:
- receiving qualitative information for a given logical partition, wherein the qualitative information is input by a user, and wherein the qualitative information input by the user includes at least one usage constraint selected from a group consisting of a number of customers, a number of transactions per unit time, an identity of a human user, a title of a human user, a grade point average of a human user attending school, and an energy cost; and
- calculating a computer resource assignment for the given logical partition based on the qualitative information and a conversion function, wherein the calculating step includes the step of calculating at least one of a processing unit assignment, a memory assignment, and an I/O slot assignment for the given logical partition, and energy;
wherein the executable instructions, when executed by the at least one processor in the digital computing device, cause the digital computing device to further perform at least one of the steps of:
- validating the executability of the calculated assignment before the calculated assignment is implemented;
- validating the advisability of the calculated assignment before the calculated assignment is implemented; and
- providing feedback to the user regarding the calculated assignment before the calculated assignment is implemented.

14. The computer program product as recited in claim 13, wherein the executable instructions, when executed by the at least one processor in the digital computing device, cause the digital computing device to further perform the step of:
displaying a graphical user interface (GUI) to the user by which the user inputs the qualitative information, wherein the qualitative information input by the user via the GUI includes at least two usage constraints comprising a number of customers and a priority.

15. The computer program product as recited in claim 13, wherein the qualitative resource assignment wizard calculates the conversion function in a training phase, wherein the training phase comprises the steps of:
- receiving qualitative information for the given logical partition periodically or non-periodically input by the user over time on multiple occasions;
- gathering computer resource usage data for the given logical partition at a point in time substantially coincident with the user's input of the qualitative information; and
- computing the conversion function by applying a data fitting method or a statistical analysis technique to the qualitative information periodically or non-periodically input by the user over time on multiple occasions and the computer resource usage data gathered during the training phase.

16. The computer program product as recited in claim 13, wherein the qualitative resource assignment wizard is a component of or operates in conjunction with partition management code executed by one or more of the at least one processor.

17. The computer program product as recited in claim 13, wherein the receiving step and the calculating step are performed in an administrative console coupled to at least one multipartitioned server over a service network, the multipartitioned server containing one or more processors, memory, and one or more I/O slots assigned to a plurality of logical partitions.

18. The computer program product as recited in claim 13, wherein the calculating step is performed in server system connected to at least one client system over a network, wherein a network server application in the server system provides software code associated with the qualitative resource assignment wizard to the client system for enabling the user to remotely input the qualitative information, and wherein a browser application in the client system transfers the remotely input qualitative information to the server system.

* * * * *